United States Patent
Loesch et al.

[15] 3,637,108
[45] Jan. 25, 1972

[54] SEED PLANTER

[72] Inventors: Leo J. Loesch; Claude E. Loesch, both of Kimball, Minn. 55353

[22] Filed: June 25, 1969

[21] Appl. No.: 836,480

Related U.S. Application Data

[63] Continuation-in-part of Ser. No. 684,357, Nov. 20, 1967, abandoned, which is a continuation-in-part of Ser. No. 599,792, Dec. 7, 1966, abandoned.

[52] U.S. Cl............................221/211, 222/167, 222/194, 302/2
[51] Int. Cl........................................................B65g 15/02
[58] Field of Search .........................221/211, 266, 167, 194; 294/64; 222/220, 221, 222, 223, 194, 167; 209/113, 86; 302/2

[56] References Cited

UNITED STATES PATENTS

| 1,997,791 | 4/1935 | Hoberg et al. | 222/222 X |
| 2,479,534 | 8/1949 | Bergh et al. | 222/221 X |

FOREIGN PATENTS OR APPLICATIONS

| 802,899 | 10/1958 | Great Britain | 221/211 |

*Primary Examiner*—Robert B. Reeves
*Assistant Examiner*—Francis J. Bartuska
*Attorney*—Williamson, Palmatier & Bains

[57] ABSTRACT

A seed dispenser for a planter including a drum with a shell at the periphery with openings in which seeds are held by positive air pressure within the drum, while moving air within the drum sweeps away all excess seeds from the openings, and seed discharge tubes receiving seeds from said openings and carrying the seeds out of the drum by the air under pressure in the drum.

40 Claims, 15 Drawing Figures

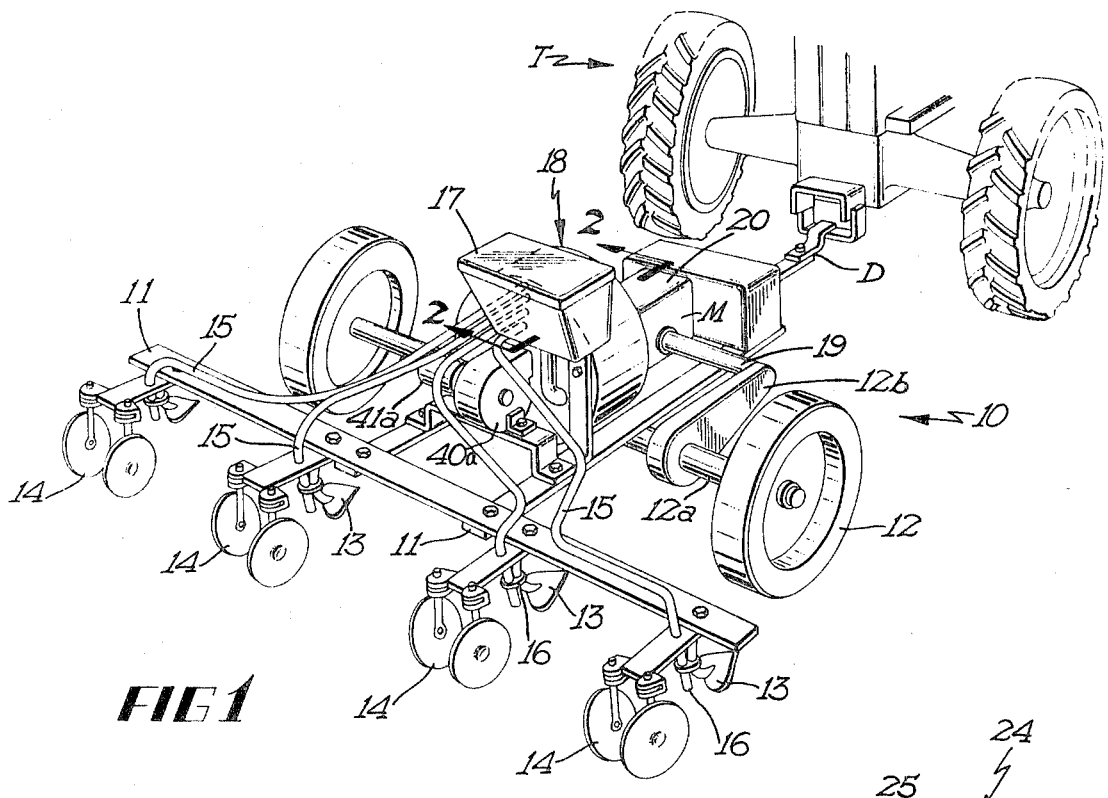
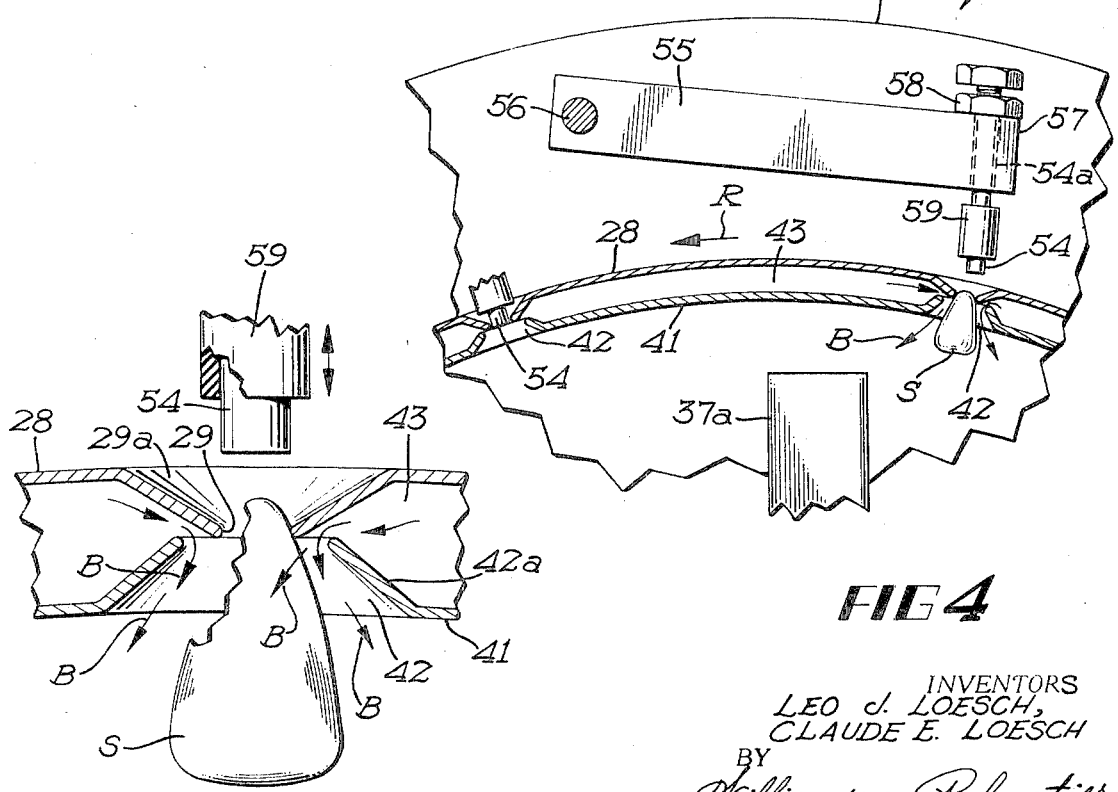

INVENTORS
LEO J. LOESCH,
CLAUDE E. LOESCH
BY Williamson, Palmatier
& Bains
ATTORNEYS

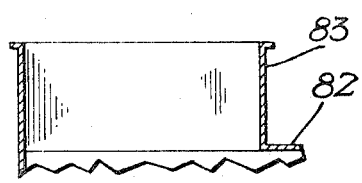
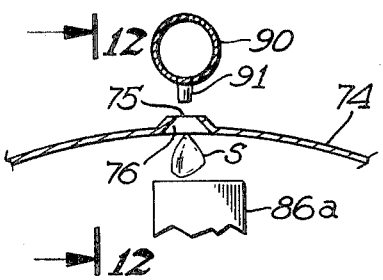
FIG 10
FIG 11
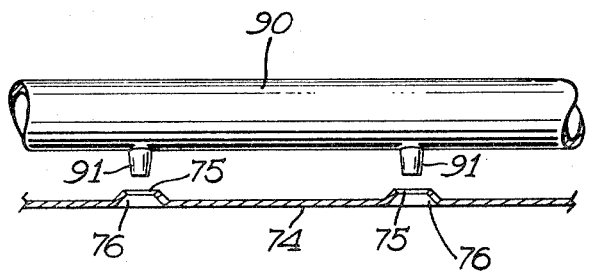
FIG 12
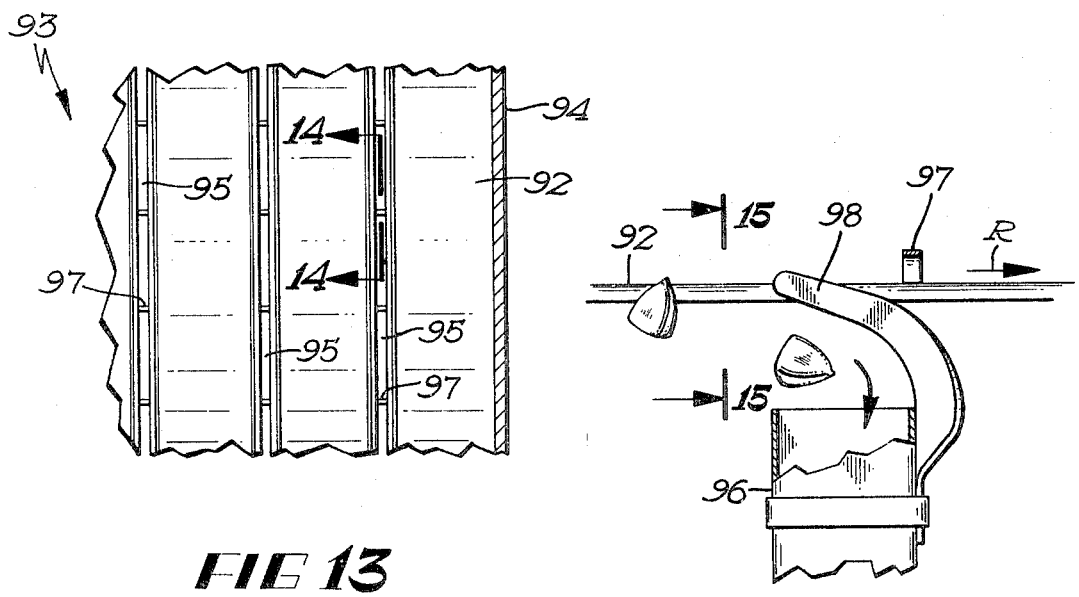
FIG 13
FIG 14
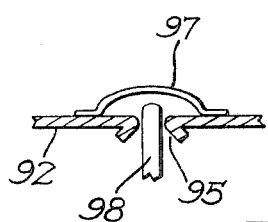
FIG 15
INVENTORS
LEO J. LOESCH,
CLAUDE E. LOESCH
BY Williamson, Palmatier
& Bains
ATTORNEYS 3,637,108

SEED PLANTER

CROSS-REFERENCES

This application is a continuation-in-part of our copending application Ser. No. 684,357 filed Nov. 20, 1967, now abandoned and entitled Seed Planter, and of our earlier copending application Ser. No. 599,792, filed Dec. 7, 1966, now abandoned.

PRIOR ART

The closest prior art is U.S. Pat. No. 2,960,258 and Great Britain Pat. No. 802,899, published Oct. 15, 1958.

BRIEF SUMMARY OF INVENTION

The seed planter employs the dispenser for discharging a succession of seeds to be evenly spaced upon planting. A supply of seeds is carried in the bottom of the rotating drum wherein a positive air pressure, above ambient, is maintained. The peripheral wall of the drum has openings therein, which, in most instances, will be discrete apertures wherein corn seeds or kernels are lodged and held by the air pressure, and carried upwardly as the drum rotates. The peripheral wall is recessed about each aperture to minimize the likelihood of more than one seed lodging at the aperture. The openings in the shell or peripheral wall of the drum may also be elongate, circumferentially extending slots for carrying certain seeds which are to be dispensed in rapid succession as for close spacing in the ground; an example being soybean seeds. Rapidly moving air is swept across the upwardly moving peripheral wall and seeds to carry away any excess seeds. In one form the drum has a double wall peripheral shell to carry such air, and in another form, such air is directed against the single shell from an adjacent manifold or nozzle. The inlet ends of stationary seed discharge tubes in the drum confront the peripheral wall at the top of the drum, and the air under pressure moves rapidly outwardly through the tubes, carrying seeds from the drum for planting. The sweep of air into the tubes dislodges and carries the seeds therewith; and, as an aid to dislodging the seeds, the apertures may be closed by soft, inflated rollers on the outside of the wall; or streams of air may be directed into the apertures from outside the drum; or apertures may be closed and the seeds moved out of the apertures by pins. Additionally, where the openings take the form of circumferential slots, a finger in each of the slots may lift the seeds therefrom.

An object of the invention is to provide a new and novel dispensing apparatus wherein pressure differentials are provided adjacent an opening in a carrier wall so as to provide airflow through the wall and provide airflow in multidirections adjacent the periphery of the opening for sweeping away excess seeds carried thereby.

A further object of our invention is to provide a new and novel dispenser for flowable material wherein the small quantities of the flowable material are isolated from the supply of material and carried upwardly on the interior of a rotary drum and then deposited in the open end of discharge tubes through which the flowable material is discharged by movement of pressurized air maintained within the drum.

Still another object of our invention is the provision of a novel seed planter incorporating a dispenser for isolating single seeds from the supply by use of flowing air and seating of the seed in an opening of a carrier and subsequently releasing the seeds and discharging the seeds through tubes under influence of the pressurized air maintained within the drum.

DRAWINGS

FIG. 1 is a perspective view of the invention in assembly with a planting apparatus and being towed by a farm tractor.

FIG. 4 is an enlarged detail section view taken approximately at 4—4 in FIG. 2.

FIG. 5 is a very greatly enlarged detail section view showing a seed carried for dispensing and also showing the air flow patterns adjacent the seed.

FIG. 10 is an enlarged detail section view taken approximately at 10—10 in FIG. 9.

FIG. 11 is a detail section view of a portion of the drum peripheral wall and illustrating a modified form of the invention.

FIG. 12 is a detail section view taken approximately at 12—12 in FIG. 11.

FIG. 13 is a detail view of the inside surface of the drum periphery and illustrating another modified form of the invention.

FIG. 14 is an enlarged detail section view taken approximately at 14—14 in FIG. 13.

FIG. 15 is a detail section view taken approximately at 15—15 in FIG. 14.

DETAILED DESCRIPTION

Figure 2:
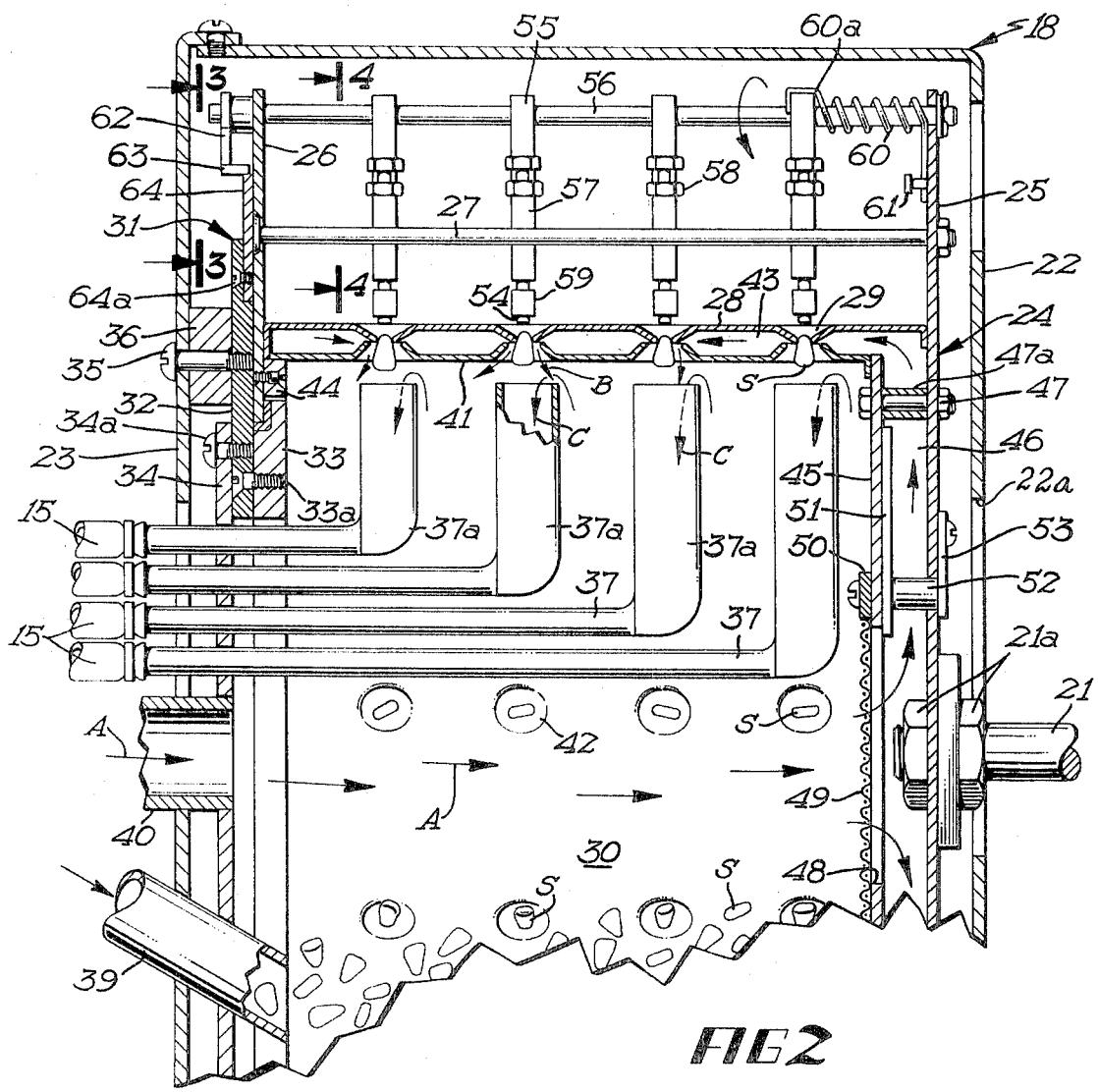
FIG. 2 is an enlarged detail section view taken at 2—2 of FIG. 1 and on a vertical plane through the dispenser apparatus.

One form of the present invention is shown in the drawings and is described in FIG. 1–6.

Where herein either the words "seed" or "small article" are used, said words are intended to include field seeds such as corn and small grains such as wheat, oats, etc., and said words are also intended to include equivalent type articles of similar size and flowability such as pills and capsules, and various types of pellets including a fabricated agglomerate of various materials pressed and dried in a substantially predetermined shape.

The planter is indicated in general by the numeral 10 and includes a frame structure 11 supported by ground wheels 12 and attached to the drawbar D of a tractor T. The planter 10 includes a plurality of digging shoes 13 for producing small furrows in the ground into which seeds are to be individually dropped; and furrow-closing discs 14 disposed immediately behind the digging shoes 13.

The planter 10 also has a plurality of seed conveying tubes or hoses 15, each having a discharge end supported by a fixture 16 immediately behind a corresponding shoe 13. The planter 10 also has a seed hopper 17 affixed to the frame thereof.

A seed dispenser is indicated in general by numeral 18 and is carried upon the planter 10 to receive seeds from the hopper 17 for discharging the seeds into the discharged tubes 15, one at a time. The dispenser is illustrated in detail in FIGS. 2–5, and is provided with rotary power from the axle 12a of the ground wheels 12 from which rotary power is supplied through a chain drive mechanism within the guard 12b, and shaft 19, a speed changing gearbox 20 from which rotary power is applied to the dispenser by shaft 21.

The dispenser 18 includes a housing 22 affixed to the frame 11 of the planter, and the housing 22 has a removable front cover 23 providing access to the rotary seed-isolating drum, which is indicated in general by numeral 24.

The dispensing drum 24 has a pair of rigid, circular end plates 25 and 26 which are affixed to each other as by a plurality of tie rods 27 spaced from each other around the periphery of the drum. The end plate 25 is affixed to and supported by shaft 21, by means of the clamping nut 21a threaded onto the shaft.

The drum 24 has an annular wall or seed carrier 28 extending around the entire periphery thereof, and affixed to both end walls 25 and 26. The peripheral wall 28 has a plurality of seed carrying openings or apertures 29 therein, and it will be noted that the peripheral wall 28 is recessed inwardly as at 29a adjacent the periphery of each of the openings 29 therein. Except for the openings 29, the peripheral wall 28 of the drum is imperforate so as to facilitate retaining of air pressure within the interior 30 of the drum.

The dispenser 18 is provided with a stationary wall structure 31 adjacent the annular, rotary end wall 26. The wall structure 31 includes a rigid imperforate annular plate 32 which overlies the outer surface of the end wall 26, and a sealing ring 33 is attached to the plate 32 as by screws 33a. The sealing ring 33 provides an air sealing relationship to the end plate 26. A cover plate 34 is affixed to the annular plate 32 and may be removed therefrom by loosening the mounting screws 34a.

It is important to note that the wall structure 31, including plate 32, sealing ring 33, and cover 34, is stationary while the end wall 26 is rotatable with the drum 24. The wall structure 31 is retained in stationary position by fastening the wall structure to the housing as by the threaded screw 35 which secures the cover 23 of the housing to the plate 32, and maintains the spaced relation by a spacer block 36. The drum 24 may thereby rotate under influence of the drive shaft 21 so as to revolve the end wall 26 relative to the stationary plate 32 and sealing ring 33, while maintaining an air sealing relationship at the inner periphery of the annular end wall 26. Of course, any suitable form of air seal may be provided between the rotary end wall 26 and the stationary structure.

The upper end of the seed discharging hoses are connected in open communication to the ends of rigid tubes 37 which are mounted on and affixed to the cover plate 34 and project into the interior 30 of the drum. The inner seed receiving ends 37a of the tubes 37 face upwardly and are aligned with each other beneath a row of seed carrying openings 29 in the peripheral wall 28 so as to receive the seeds S carried thereby. The open seed receiving ends 37a are disposed immediately beneath the location at which release of the seeds from the openings is obtained.

A seed supply spout 39 also projects through and is affixed in the cover plate 34 adjacent the lower periphery of the drum 24. The supply spout 39 is connected to the seed hopper 17 to receive seeds therefrom, thereby maintaining a continuous supply of seeds in the lower portion of the revolving drum 24.

The cover 34 also has an air inlet conduit 40 affixed thereon and concentric of the axis of drum 24. It will be noted that the conduit 40 directs inflowing air along and parallel to the axis of the drum, as indicated by the arrows A. Air is supplied to the conduit 40 from a blower or fan 40a mounted on the frame 11 of the planter 10 and is driven by a suitable source of rotary power 41a for stepping up the speed of rotation and receiving the power from the ground drive wheels 12 and through the variable speed gearbox 20. The blower creates an air pressure differential in the interior 30 of the drum as compared with the atmosphere whereby to normally produce an outward flow of air through the openings 29 in the peripheral wall 28, and to seat and retain the seeds S in the openings 29, substantially as illustrated in FIGS. 2 and 5.

The air pressure initially seats the seeds S in the openings 29 as the openings pass beneath the tumbling supply of seeds maintained in the lower peripheral portions of the drum 24. The pressure of the air retains the seeds as they are carried upwardly during revolving of the drum. The supply of seeds in the lower periphery of the drum is maintained at a depth such that the level of the top of the supply of seeds is approximately adjacent the lower discharge end of the supply spout 39 which is normally continuously full of seeds and will supply seeds into the drum when the level of seeds decreases. The seed hopper 17 will be noted to have a lid on it to minimize the possibility of escape of air pressure through the seed hopper.

Means are provided for preventing clustering of seeds around the periphery of each of the openings 29 as the drum is revolved and as the openings 29 move upwardly and out of the supply of seeds in the lower portions of the drum, and such means produces an air pressure differential adjacent the periphery of each of the openings 29 whereby to cause flow of air in multiple directions, around and across the periphery of the openings 29 and also in a direction generally along the seed S seated in the opening and away from the peripheral wall 28 and toward the interior 30 of the drum 24, substantially as illustrated by arrows B in FIG. 5. Such means includes an inner peripheral wall 41 in closely spaced and confronting relation with the peripheral wall 28, and having a plurality of openings of apertures 42, each aligned with a respective opening 29 in the outer peripheral wall 28. It will be noted that the apertures 42 are concentric with and substantially larger than the openings 29, and further, that the inner wall of 41 is recessed or tapered conically at 42a adjacent the periphery of each of the apertures 42 so that the peripheries of each of the openings 29 and its corresponding aperture 42 are in closely spaced relation and very nearly on a common plane. As a result of the conically recessed portions 29a and 42a of the peripheral wall 28 and the inner confronting wall 41, the annular air manifold space 43 between the walls has a substantial air carrying capacity to deliver the proper amount of air to the apertures 42 for sweeping away the excess seeds which may be clustered adjacent the seed S and against the plate 41 around the periphery of the aperture 42. The tapered area 29a in the peripheral wall 28 facilitates the approach of the air from the manifold area 43 so that the air will traverse the periphery of opening 29 and through the aperture 42 in the proper direction of arrow B so as to sweep away the excess of seeds which may tend to cling around the seed S. The tapered peripheral portion 42a around each of the apertures 42 also prevents wedging of extra seeds into the aperture 42 adjacent the seed S and thereby removal of the excess seeds which may tend to cling is made substantially easier.

One side edge of the inner apertured wall 41 is affixed to a rigid supporting ring 44 affixed to the end wall 26. The other side edge of the apertured annular wall 41 is affixed to the outer marginal edge of a circular rigid panel 45 lying parallel to and in confronting relation with the end wall 25 of the drum, and thereby defining an annular air conduit or manifold space 46 in open communication with the manifold space 43 around the entire periphery of the drum 24 for supplying air under pressure thereto. The panel 45 is rigidly affixed to the end wall 25 of the drum by a plurality of clamping bolts 47 with spacer sleeves 47a thereon.

The panel 45 has a large opening 48 concentric of the rotation axis of the drum 24 and aligned with the stream of air flowing in the direction of arrow A from the inlet conduit 40. A screen 49 having large openings therein overlies the opening 48 and prevents seed S from passing through the opening 48 into the manifold areas 46 and 43. The screen 49 is retained by clamping ring 50 affixed to the panel 45.

The panel 45 may carry a valve plate 51 to swing into overlying relation with the opening 48 and to thereby partially close the opening 48, whereby to adjust the quantity of air passing into the manifold areas 46 and 43. The plate 51 is affixed to a rotary hub 52 extending through the end wall 25 and having a handle 53 affixed thereto to facilitate adjustment of the position of the plate 51 from outside the drum 24. An opening 22a may be provided in the housing to facilitate obtaining access to the handle 53.

As an aid to the sweep of air for carrying the seeds into the tubes 37, means are provided for obtaining release of the seeds S from the openings 29 in the peripheral wall 28 as the openings and seeds pass over the upper ends 37a of the discharge tubes. In the form shown, such means include a plurality of release pins 54, each disposed outwardly of and in alignment with a respective opening 29 in the peripheral wall 28. Whereas the openings 29 are oriented in a plurality of rows in the outer wall 28, and wherein the rows are spaced from each other around the periphery of the wall 28, a plurality of the release pins 54 are supported in side-by-side relation on mounting arms 55 affixed and supported on shafts 56. The shafts 56 are mounted on the end walls 25 and 26 for rocking oscillation and are spaced from each other around the periphery of the drum 24 for operating the release pins 54 at each row of openings 29 in the outer wall 28. The arms 55 are welded or otherwise affixed to the shafts 56, and each of the arms 55 has a threaded sleeve 57 into which the threaded shank 54a of a corresponding release pin 54 is adjustably mounted. Lock nuts 58 are provided on the threaded shanks of the release pins for locking against the threaded sleeves 57 and retaining the release pins 54 in predetermined position. Each of the release pins 54 also carries a resilient rubber sleeve 59 for engaging the peripheral wall 28 adjacent the opening 29 when the pin 54 engages a seed in the opening.

Each of the shafts 56 is continuously urged in a clockwise direction as viewed in FIG. 4 by a coil spring 60 thereon. One end of the coil spring is anchored at a pin 61 on the end plate 25 of the drum, and the other end of the spring has a hook 60a formed therein and attached to the first adjacent arm 55, tending to swing the arm 55 and the release pin 54 toward the drum periphery.

Figure 3:
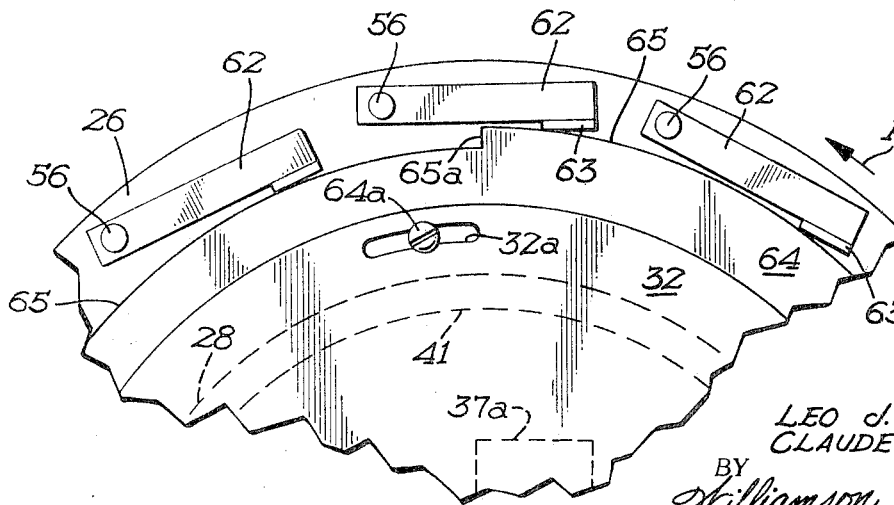
FIG. 3 is an enlarged detail or elevation view taken approximately at 3—3 in FIG. 2.
Figure 6:
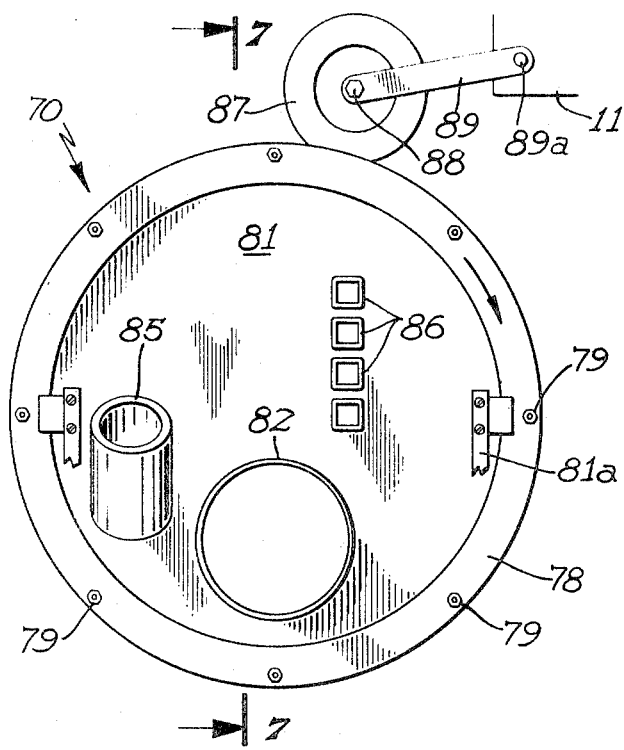
FIG. 6 is an end elevation view of the drum of another form of the invention with the single wall shell at the drum periphery.

As seen in FIGS. 2 and 3, each of the shafts 56 has an operating arm 62 affixed thereon adjacent the end plate 26. Each of the operating arms 62 has a cam follower 63 facing inwardly against a stationary cam 64 which is affixed to the plate 32 as by screws 64a. The cam 64 has a cam edge 65 which extends around the entire periphery of the drum 24, and is provided with a step or shoulder 65a positioned with respect to the upper ends 37a of the discharge tubes so that, as the drum 24 revolves in the direction of arrow R, the cam followers 63 move over the step 65a and the spring 60 will thereupon rock the corresponding shaft 56 and swing all of the release pins thereon into engagement with the seeds in the corresponding row in the drum periphery. In order to provide the necessary adjustability in locating the step 65a in relation to the proper release point for the seeds carried by the drum, the cam mounting panel 32 is provided with an elongate and arcuate slot 32a through which the clamping screw 64a extends. By simply loosening the clamping screws 64a, the cam 64 may be rotatably adjusted so as to obtain the release of the seeds from the drum periphery at the proper instant. Also by shifting the cam 64, it is possible to render the dispenser inoperative, as may be desired under certain circumstances. In order to render the dispenser inoperative in this way, the shoulder or step 65a is merely positioned so that the seeds which are released from the openings 29 in the drum periphery, simply miss the tubes when they are released.

It will be noted that the cam edge 65 is formed to very smoothly and gradually swing the cam followers 63 outwardly from the rotation axis of the drum as the drum and the cam followers revolve so as to retract the release pins 54 from the openings 29 as the openings 29 revolve downwardly to the seed supply to pick up an additional seed. The pins 54, together with the resilient sleeves 59 substantially close the openings 29 after the seeds have been released so as to avoid substantial loss of air through these openings.

It should be recognized that when the release pins swing inwardly against the seeds and into the openings 29, the seeds are physically pushed inwardly which provides certain advantages although it is recognized that other seed release devices, such as soft resilient rollers (see FIGS. 6, 7, 9) for rolling on the drum periphery at the release point may provide physical pushing of the seeds out of the holes, or may simply provide an air seal across the opening to reduce the air differential which holds the seeds in the openings, or both. Such rollers may or may not have nibs projecting from the periphery. Other similar devices might be used for urging the seeds out of the openings, such as movable seed urging pins or actuators mounted stationary to the frame of the machine and triggered or cam operated in accordance with the movement of the drum.

The pins 54 on the arms 55 and operated by the cam 64 has certainly the advantage of the accurate location of the pins with respect to the openings 29 for properly engaging the seeds in each of the openings.

In operation, the planter is drawn along the field with a supply of seeds in the hopper 17, which provides an immediate supply of seeds in the lower peripheral portion of the drum 24. Movement of the ground wheels 12 along the ground produces revolving of the drum 24 and operation of the blower 40a. A stream of air is directed from the conduit 40 into the interior 30 of the drum and along the rotation axis of the drum in the direction of arrow A. The main thrust of the stream of air is into the conduit or manifold area 46 adjacent the screen 49. Air pressure differentials are created in the interior 30 of the drum with respect to the atmosphere or exterior, and in the manifold areas 43 so as to produce an airflow outwardly through the openings 29, which holds the seeds S in the openings 29 of the outer wall 28. In the drawings the seeds are intended to be kernels of corn which are generally rectangular, but certainly not circular in shape in most cases. Small quantities of air continue to flow outwardly through the openings 29 and additional air acting in this same outward direction causes the seeds S to seat and be held in the openings 29 as illustrated in the drawings. The outward flowing air produces a dust removing and cleaning effect at the outside of drum 24. The air differentials also produce the airflow from the manifold areas 43 and into the interior 30 of the drum in the direction of arrows B so as to move the air around the seeds S which are seated in the openings 29 and along such seeds and transversely of said seeds in multidirections and thereby any excess seeds from the supply in the lower portion of the drum are removed by this air traveling from the manifold areas into the interior spaces 30 of the drum. Because of the shape of the portions 42a of the inner wall of 41, there will be no wedging of seeds to the degree which causes locking or seating of seeds adjacent the seed which is actually confined in the opening 29.

As a result, the seeds are carried upwardly at the openings 29 as the drum 24 revolves. As the seeds approach the area of the discharge tubes 37, the corresponding cam follower 63 is approaching the step 65a on the cam 64, and as the row of openings 29 are aligned with the several discharge tubes 37 the cam follower 63 moves off the step 65a and causes the release pins to move inwardly under influence of spring 60 and urge the seeds out of the openings 29 and in an inward direction toward the discharge tube. The air pressure within the interior 30 of the drum is continuously producing a flow of air into the inner ends 37a of the tubes as indicated by arrows C, and this continuous flow of air in the direction of arrows C changes the airflow currents adjacent the openings 29 and seeds S at the tubes to assist in releasing and carrying the seeds away from the opening 29 and into the discharge tubes, whereupon the seeds are carried outwardly from the drum 24 and through the hoses 15 to be planted in the furrows behind the shoes 13.

The use of the discharge tubes 37 with the air from the pressurized interior of the drum for carrying the material delivered to the upper and open inner ends of the discharge tubes to an exterior location where such material is desired for deposit is useful without regard to the manner in which the physical material is delivered to the tubes on the drum periphery. This discharge method, using the tubes and the pressurized air flowing outwardly therethrough is useful even though the material may be delivered by means of a fine mesh screen or fabric as in the case of a finely powdered or ground, dustlike material. As the release pins 54 urge the seeds out of the openings 29, the release pins together with the sleeves 59 essentially close the openings 29 to minimize the loss of air pressure within the drum. The openings 29 move downwardly as the drum revolves and pass beneath the supply of seeds in the bottom area of the drum and thereby pick up additional seed for delivery to the discharge tubes 37 again.

It may be desirable, depending on the nature of the seeds S being handled, to adjust the amount of airflow through the manifold spaces 46 and 43, and the valve plate 51 may be adjusted partly across the opening 48 in the panel 45 whereby to decrease the amount of air pressure differential adjacent the periphery of the openings 29.

Although the illustrations show the seeds S to be kernels of corn, this apparatus is well adapted for handling a wide variety of seeds, including small grains such as oats, wheat, and various row crops which are to be planted one seed at a time and in a furrow to be lightly covered with soil. With various seeds of various types, it may be necessary to utilize a drum with the proper size openings 29.

It will be seen in FIGS. 1–5 that we have provided a new and novel planting device utilizing a dispenser for isolating seeds and handling the seeds one at a time for delivery to the desired point of use or planting. The isolating of the single seeds is accomplished by creating pressure differentials adjacent the openings in which the seeds are carried and thereby producing a flow of air through the openings for seating the seeds and a reverse or transverse flow of air around the periphery of the openings and seeds for sweeping away the excess seeds which might otherwise form in clusters. The single seeds are released and then conveyed by the air pressure within the drum through the discharge tubes for planting.

Figure 7:
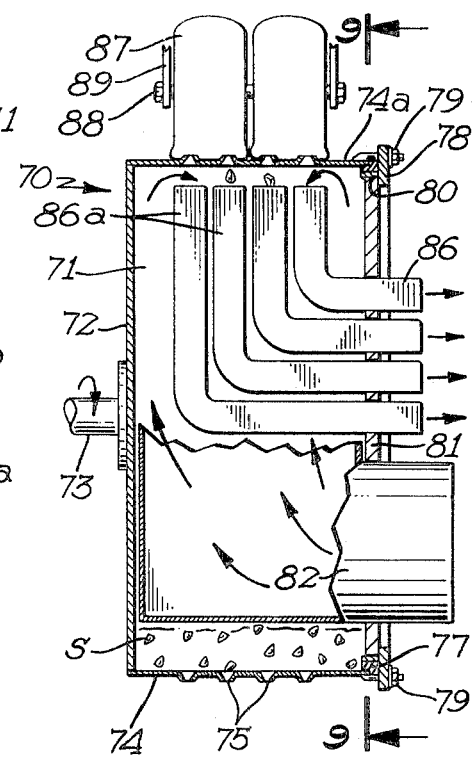
FIG. 7 is a detail section view taken approximately at 7—7 in FIG. 6.
Figure 8:
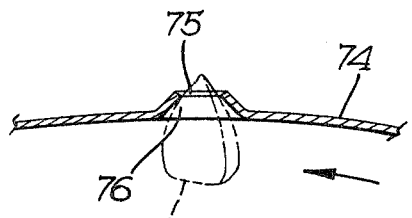
FIG. 8 is an enlarged detail section view of one of the apertures in the peripheral wall of the drum.

In the form illustrated in FIGS. 6–10, the dispenser drum is indicated by numeral 70 and defines an enclosed space 71 therein which is maintained under a positive air pressure, above ambient, when the dispenser is operating. The drum 70 has an end wall 72 connected to a drive shaft 73 so as to revolve the drum from the ground wheels of the planter. The drum has a single, cylindrical peripheral wall or shell 74 with a plurality of openings or apertures 75 formed therein. The apertures 75 are arranged in rows extending circumferentially of the peripheral wall 74 and in cross rows lying parallel to the axis of the drum. The peripheral wall 74 is dimpled or recessed at 76 around the periphery of each of the apertures 75, as best seen in FIG. 8. The recess is substantially conically shaped and is of such a size that when a seed S is lodged in the aperture 75, another similarly sized seed will not find it possible to become lodged in the same area adjacent the recess 76. Any extra seed which may be in the vicinity of the recess 76 will simply fall by gravity from the peripheral wall 74 as the other seed S remains lodged or seated in the aperture 75 under influence of the air pressure within the interior 71 of the drum.

The end edge 74a of the peripheral wall is engaged with an annular sealing ring 77 and is clamped in rigid position on the drum by a clamping ring 78 which is retained by studs and nuts 79 secured to the edge 74a of the peripheral wall.

The ring 78 may have a rigid and supporting ring 80 to engage the circumferential edge of the stationary rigid closure plate 81 which is supported by brackets 81a from the frame of the planter. The plate 81 cooperates with the shaft 73 in physically supporting the drum 70.

The plate 81 has the air delivery conduit 82 mounted thereon and extending therethrough to deliver air from a fan (illustrated at 40a in FIG. 1) into the interior 71 of the drum. The air duct 82 is cut away within the drum 70, and a distributor duct 83 is attached to the duct 82 for carrying the air outwardly and upwardly toward the peripheral wall 74, and in the area of the wall where the wall is carrying the seeds S upwardly. The duct 83 is substantially rectangular in configuration as illustrated in FIGS. 9 and 10, and carries an air directing baffle 84 at its outer end for causing the air to sweep across the openings in the peripheral wall 74 in order to sweep away any excess seeds that might possibly remain lodged.

Figure 9:
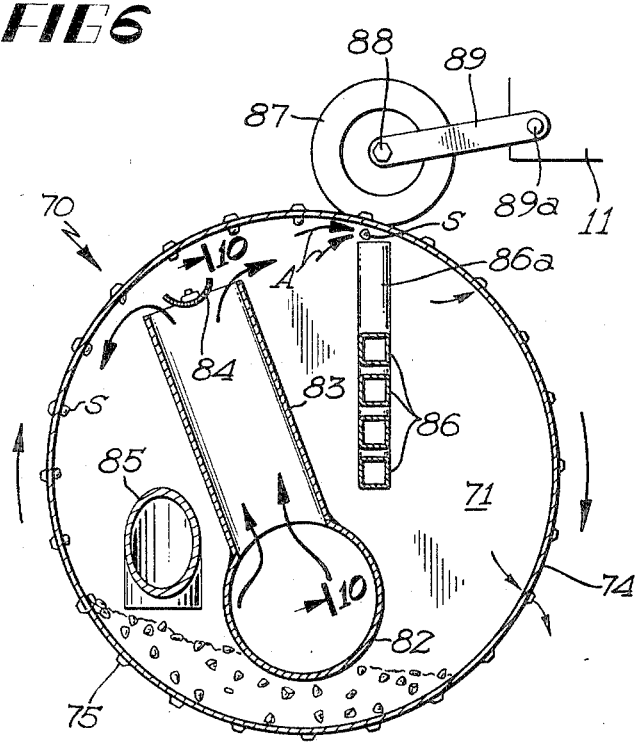
FIG. 9 is a detail section view taken approximately at 9—9 in FIG. 7.

The plate 81 also carries the inner end of a seed supply tube 85, the outer end of which is connected to the closed seed hopper, and the inner end of which extends into the bottom area of the drum, substantially as seen in FIG. 9, so as to maintain a constant supply of seeds in the bottom of the drum.

The plate 81 also carries the seed discharge tubes 86 which, as seen in FIGS. 7 and 9, are aligned with each other in a direction longitudinally of the drum so as to respectively receive the seeds from each of the apertures in one transverse row. It will be noted that the upper inlet ends 86a of the discharge tubes confront the inner periphery of the wall 74 in spaced relation. The tubes 86 extend outwardly through the wall 81 in seated relation with the wall and are to be connected to the flexible hoses or tubes of the type illustrated at 15 in FIG. 1 for depositing the seeds in the rows. The positive air pressure in the interior 71 of the drum produces a rapid flow of air outwardly through the tubes 86 so as to carry the seeds rapidly through the tubes for planting behind the digger shoes of the planter. It has been found that the air sweeping into the tubes 86 as indicated by the arrows A in FIG. 9 causes the seeds in adjacent apertures 75 to be dislodged and carried directly into the closest discharge tube 86. This has been observed to draw all of the seeds from the shell 74 into the tubes without necessarily closing the apertures 75.

It has been found desirable, in the form illustrated in FIGS. 6–10 as an aid to dislodging the seeds S from the apertures 75 to offset the effect of the pressure within the interior 71 so as to assure that the air sweeping in the direction A and into the tubes 86 causes dislodging of the seeds and, for this purpose, a plurality of soft, inflated rollers 87 are mounted on a common axle 88 such that the rollers 87 roll upon the outer surface of the shell 74 adjacent the tubes 86. The inflated rollers 87 are rather soft so that the lower portion thereof deforms substantially and engages a substantial area of the outer surface of the shell 74, along a circumferential length of the shell near the tubes 86. The axle 88 of the rollers 87 is mounted on a swingable subframe 89 which is pivoted for vertical swinging at 89a to the frame 11 of the planter. Of course, hard rubber rollers could be substituted for rollers 87 in some applications of this device.

As an alternative aid to dislodging the seeds from the apertures 75, there is illustrated in FIGS. 11 and 12, an air manifold 90 with a plurality of downwardly opening nozzles 91 directing streams of air against the outer surface of the shell 74 at a location adjacent the tubes 86 so that the stream of air counteracts the effect of the pressure within the interior chamber 71 of the drum when the seed carrying apertures 75 of the drum pass beneath the nozzles 91, thereby dislodging the seeds which are thereupon swept into the inlet ends of the tubes 86. This manifold 90 with the nozzles is to be used as an alternative to the rollers 87 illustrated in the other figures.

In FIG. 13 appears the inner surface of the peripheral shell 92 of the drum 93 of a modified form of the invention. The end wall 94 of the drum is connected as in the first form of the invention to the peripheral wall 92 of the drum. The peripheral wall 92 of the drum has a plurality of openings or slots 95, which extend circumferentially of the wall 92 so as to carry a row of seeds for discharge through the tubes 96 in rapid succession. The drum revolves in the direction of arrow R as seen in FIG. 14 over the inlet end of the ends of the tubes which are disposed directly beneath the slots 95. As seen in FIG. 15, the shell 92 is formed with a recess area adjacent the slots 95. The peripheral wall 92 has its several annular segments held together by a plurality of bridges or brackets 97 welded or otherwise affixed to the wall segments and bridging across the slots 95 at the outer side of the drum. It will be recognized that the previously illustrated very soft rollers or streams of air may be used in this form of the invention to aid in dislodging the seeds adjacent the inlet ends of the tubes 96, and, in addition, this form of the invention may employ a seed-lifting finger 98 mounted on the upper end of each of the tubes 96 and extending into the corresponding slot 95 for lifting the seeds from the shell 92 and allowing the sweeping air to carry them into the inlet ends of the tubes 96. This particular form of the invention illustrated in FIGS. 13–15 is particularly suited to dispensing seeds which are to be dispensed in rapid succession, as for close planting along the crop row on the ground. Typical of such class of seeds would by soybean seeds which are supplied rapidly as the planter moves along the ground so that the seeds are very closely spaced together.

Whereas in the forms shown in FIGS. 6–15 the periphery shell of the drum is constructed of a single thickness of sheet metal, it will be recognized that the openings 75 and 95 may take the form of air exhaust ducts if the shell were of somewhat thicker or fabricated construction. Such ducts may extend in various directions for effecting air control; for example, the ducts from a cross row of apertures may be connected together and into a manifold for simultaneously controlling exhaust air and release of the seeds or articles.

It will be seen that we have provided a seed dispenser for a planter wherein a single or double shell is used around the periphery of a drum or carrier wherein seeds are held in lodged condition in the apertures by air pressure. Sweeping air adjacent the shell carries away excess seeds so that only the prescribed number are dispensed through the discharge tubes through which the seeds are carried by air moving at substantial velocity as a result of the air pressure at the shell. Dislodging of the seeds from the openings in the drum periphery may be aided by knock fingers or pins or by the exterior rollers or air streams, or by the camming fingers in the case of the slotted drum.

What we claim is:

1. In a dispensing apparatus in which seed is deposited in a drum having a periphery facing inwardly and transversely of the rotation axis, the periphery having air pervious openings, each with an opening-enclosing perimetric edge portion and including means for directing seeds into said openings and holding a single seed on the perimetric edge portion of each of the openings, selecting means adjacent each of said openings for there creating an air pressure differential adjacent the interior of the drum to create an airflow around said opening and around the single seed held in each of said openings and thereby carry the remaining seeds away therefrom.

2. An apparatus according to claim 1 in which said selecting means includes an air chamber with an air discharge adjacent the periphery of each of said openings and directing air around and away from each of said openings to remove all but one of a cluster of seeds collected adjacent each of said openings at the interior surface of the drum.

3. In a dispensing apparatus in which seed is deposited in a drum having openings therein and including means for directing seeds into said openings and holding a single seed in each of the openings, selecting means adjacent each of said openings for there creating an air pressure differential adjacent the interior of the drum to create an airflow around said opening and around the single seed held in each of said openings and thereby carry the remaining seeds away therefrom, said drum having a double wall, said openings being in the outer wall, the inner and outer walls being spaced to define an air pressure chamber, the inner walls being apertured at each of the openings to direct air around each of said openings to remove all but one of a cluster of seeds collected adjacent each said opening at the interior of the drum.

4. In a seed-dispensing apparatus comprising in combination, a unitary rotatable member having peripheral openings therein, means for supplying seed interiorly thereof, means for rotating said member, pneumatic means operative within said member for creating a differential of pressure between the interior and exterior thereof whereby a cluster of seed is accumulated at each of said openings, and means surrounding each of said openings at the interior of said member for directing a flow of air around said opening to remove all but one seed therefrom.

5. A seed planter comprising in combination, a rotatable member having openings therein, means for supplying seed interiorly thereof, means for rotating said member, pneumatic means operative within said member for creating a differential of pressure between the interior and exterior thereof whereby a cluster of seed is accumulated at each of said openings, means surrounding each said opening at the interior of said member for directing a flow of air around each of said openings to remove all but one seed therefrom, means to positively dislodge said seeds in said openings, means to direct seeds so dislodged to predetermined locations, and said pneumatic means cooperating with said last-mentioned means to create an airflow therethrough.

6. In a dispensing apparatus in which seed is deposited in openings in the periphery of a rotatable member, a single means creating air pressure differentials adjacent each of said openings for producing an airflow through the opening to seat a seed therein and to also produce airflow around said opening when a single seed is held in each of said openings to sweep the remaining seeds away, said rotatable member having a double wall on the periphery thereof, the outer wall having said openings therein, said means including the inner wall having an aperture at each of the openings, the inner and outer walls defining an air chamber from which air is directed around each of said openings when a single seed is held in each of said openings and the remaining seeds are carried away therefrom.

7. An apparatus according to claim 6 and the inner wall being conically tapered around each of the apertures and toward the outer wall.

8. In a seed-dispensing apparatus comprising in combination, a rotatable member having an outer peripheral wall with openings therein, means for supplying seed within the interior of said rotatable member, means for rotating said member, an inner peripheral wall on said rotatable member and confronting said outer peripheral wall and defining an air manifold therebetween, said inner peripheral wall having a plurality of apertures substantially concentric with said openings and facilitating seating of seeds in said openings, and means creating an air pressure within the interior of said rotatable member and an airflow outwardly through said openings to retain the seeds therein and also creating an air pressure differential between said air manifold and the interior of the rotatable member and a secondary airflow through said apertures and at the peripheries of said openings into the interior to sweep away excess seeds from said openings.

9. In the apparatus according to claim 8, said inner wall being recessed at the periphery of said apertures and toward the outer wall and thereby minimize wedging of seeds in clusters in said apertures.

10. In the apparatus according to claim 9, said outer wall being recessed at the peripheries of said openings and inwardly toward said inner wall whereby to direct the air from the air manifold through said aperture in the inner wall and along the seed to sweep away the excess seeds.

11. A dispensing apparatus in which flowable material is deposited in a drum with a periphery upon which the flowable material is carried upwardly as the drum rotates, a stationary discharge tube having an open-inlet end within the drum and adjacent the material carrying periphery and receiving such material from the periphery, and means creating a positive air pressure within the drum and producing an airflow outwardly through the tube for conveying the flowable material outwardly therethrough.

12. A dispensing apparatus in which seeds are deposited in a drum with openings in the periphery thereof and carrying the seeds upwardly as the drum rotates, a stationary discharge tube having an open inlet end within the drum and adjacent the seed carrying periphery to receive the seeds from the drum periphery, and means creating a positive air pressure within the drum and whereby producing seed retaining airflow outwardly through the drum periphery openings and also producing seed conveying airflow outwardly through the tube.

13. In a dispensing apparatus in which seed is deposited in a drum having openings therein and including means for directing seeds into said openings and holding a single seed in each of the openings, selecting means adjacent each of said openings for there creating an air pressure differential adjacent the interior of the drum to create an airflow around said opening and around the single seed held in each of said openings and thereby carry the remaining seeds away therefrom, an obstruction at the exterior of the drum and confronting each of said openings and preventing passage of seeds through and away from the opening while permitting airflow outwardly therethrough, the obstruction confronting each of said openings comprising a seed ejector movable toward the opening to engage and dislodge the seed carried therein.

14. A dispensing apparatus for dispensing discrete small articles comprising a revolvable carrier having a periphery with openings therein capable of carrying said articles toward the inlet of at least one article discharge passage, means creating and applying a superatmospheric air pressure against said periphery and against the articles in said openings to hold the articles in the openings for delivery to said inlet.

15. A dispensing apparatus for dispensing discrete small articles comprising a revolvable carrier having an endless periphery with openings therethrough capable of carrying and moving said articles as the carrier is revolved, means applying a superatmospheric air pressure against said periphery and against the articles in the openings to hold the articles in the openings, and discharge means adjacent the carrier for receiving the articles delivered thereby and discharging the articles away from the carrier.

16. The dispensing apparatus according to claim 15 and each of the openings being a discrete aperture in which a single seed is lodged and held under influence of the superatmospheric air pressure.

17. The dispensing apparatus according to claim 15 and said openings being elongate slots extending circumferentially of the carrier periphery and carrying seeds in rows to the discharge means.

18. The dispensing apparatus according to claim 15 and each of the openings including perforate means, the periphery having a recessed portion surrounding each of said perforate means positioned for receiving one of said discrete small articles in seating relation.

19. The dispensing apparatus according to claim 16 and said periphery of the structure having recessed portions surrounding the apertures for receiving said discrete small articles in said apertures in seating relation.

20. A dispensing apparatus for dispensing discrete small articles comprising a revolvable carrier having an endless periphery with openings therethrough capable of carrying and moving said articles as the carrier is revolved, means applying a superatmospheric air pressure against said periphery and against the articles in the openings to hold the articles in the openings, discharge means adjacent the carrier for receiving the articles delivered thereby and discharging the articles away from the carrier, and release means for releasing said articles from said openings delivery to said discharge means.

21. A dispensing apparatus for dispensing discrete small articles comprising a carrier having a movable endless peripheral surface capable of carrying said articles toward the open inlet end of at least one discharge tube leading away from said peripheral surface, means creating a positive air pressure producing airflow through said tubes for conveying said articles away from said carrier, said peripheral surface having openings in which said articles are held by said positive air pressure.

22. A dispensing apparatus for dispensing discrete small articles comprising a structure having a movable endless peripheral surface capable of carrying said articles toward the open inlet end of at least one discharge tube leading away from said peripheral surface, means creating a positive air pressure producing air through said tubes for conveying said articles away from said structure, said peripheral surface having openings in which said articles are held by said positive air pressure, and release means for releasing said articles from said openings for delivery to said discharge tubes.

23. A dispensing apparatus for dispensing discrete small articles, comprising in combination an article discharge passage having an inlet into and through which articles are adapted to enter the passage for discharge therethrough, a revolvable carrier structure having obverse and reverse peripheries of which the obverse periphery has recess means therein for receiving said articles and said structure also has duct means communicating between said recess means and the reverse periphery, said recess means being disposed relatively to the passage inlet to successively advance the received articles into contiguity with said inlet pursuant to the revolving motion of said structure, means for revolving said structure, means for creating an air pressure differential between said peripheries pursuant to creating superatmospheric air pressure on the obverse periphery for releasably holding the articles in the recess means contiguous to said duct means as the so-held articles advance relatively to said passage inlet, and means operable in timed relation with revolving motion of the structure to effect escape of the advancing articles from the recesses into said passage inlet.

24. The combination set forth in claim 23, wherein the last-mentioned means comprises a sealing structure adapted to restrict said communication with a portion of said reverse periphery to interrupt said air pressure differential at a portion of the recess means disposed in a position to have advanced articles therein in contiguity with the inlet of the article discharge package.

25. The combination set forth in claim 23, wherein said last mentioned means comprises an ejecting structure adapted to eject the articles from the recess means.

26. The combination set forth in claim 23, wherein the discharge passage inlet is subjected to said superatmospheric air pressure for creating an airstream discharging through said passage for propelling the escaped articles therethrough which have entered the passage inlet.

27. A dispensing apparatus for dispensing discrete small articles, comprising in combination an article discharge passage having an inlet into and through which articles are adapted to enter the passage for discharge therethrough, a revolvable carrier structure having a periphery with recess means therein having article-receiving portions disposed relatively to the passage inlet to advance with received articles seated therein successively toward contiguity with said passage inlet pursuant to the revolving motion of said structure, said structure having air exhaust duct means communicating with said article-receiving portions, means for establishing through the duct means an air pressure differential between the article-receiving portions and the duct means attendant to creating superatmospheric air pressure on said periphery and on articles seated in the article-receiving portions to releasably hold the articles in such portions while such held articles are advanced by the revolving structure, and means operable in timed relation with the revolving motion of said structure to effect escape of the advancing articles from the article-receiving portions into said passage inlet, and said last-named means including a sealing structure adapted to restrict airflow through said exhaust duct means from the advancing article-receiving portions to diminish said air pressure differential substantially coincident with such portions attaining said contiguity with the passage inlet.

28. A dispensing apparatus for dispensing discrete small articles, comprising in combination an article discharge passage having an inlet into and through which articles are adapted to enter the passage for discharge therethrough, a revolvable carrier structure having a periphery with article-receiving recesses therein disposed relatively to the passage inlet to advance with said articles therein successively toward contiguity with said inlet pursuant to revolving motion of said structure, means for revolving said structure, said structure having air exhaust ducts communicating with said recesses, means including said ducts for establishing an air pressure differential between said recesses and the ducts attendant to creating superatmospheric air pressure on said periphery and on articles in said recesses to releasably hold the articles in said recesses while such held articles are advanced by the revolving structure, and means operable in timed relation with the revolving motion of said structure to effect escape of the advancing articles from the recesses into said passage inlet, and said last-named means including a sealing structure adapted to restrict flow of air from said advancing recesses through said ducts to diminish said air pressure differential substantially coincident with the recesses attaining contiguity with said passage inlet.

29. A dispensing apparatus for dispensing discrete small articles comprising a rotatable drum with a periphery capable of carrying said articles to the open inlet ends of discharge tubes leading away from the drum, means creating a positive air pressure within the drum and producing airflow through the tubes for conveying said articles away from the drum, the drum having a shell defining the periphery thereof and having openings in which said articles are held by the positive air pressure for delivery to the discharge tubes.

30. The dispensing apparatus according to claim 29 and each of the openings being a discrete aperture in which a single discrete small article is lodged and held under influence of the positive air pressure.

31. The dispensing apparatus according to claim 29 and said openings being in the form of elongate slots extending circumferentially of the drum periphery and carrying said discrete small articles side by side in continuous rows to the discharge tubes.

32. The dispensing apparatus according to claim 30 and the shell having recessed portions surrounding the apertures for receiving said discrete small articles in said apertures in seating relation.

33. The dispensing apparatus according to claim 30 and means directing moving air within the drum and across the apertures carrying said discrete small articles to sweep away excess articles.

34. The dispensing apparatus according to claim 29 and additional release means positioned adjacent the tubes and reducing the effect of the air pressure on the discrete small articles and thereby dislodging the articles for delivery into the inlet ends of the tubes.

35. The dispensing apparatus according to claim 34 and the openings in the drums being in the form of elongate slots extending circumferentially of the drum periphery, and said additional release means comprising lifting fingers adjacent the tubes and in the slots positioned for dislodging the articles for delivery to the inlet ends of the discharge tubes.

36. The dispensing apparatus according to claim 30 and means positioned at the periphery of the shell and adjacent the discharge tubes for offsetting the effect of the air pressure within the drum to release the articles from the apertures for delivery to the inlet ends of the discharge tubes.

37. The dispensing apparatus according to claim 30 and including rollers engaging the outer periphery of the shell adjacent the discharge tubes for successively closing the apertures to allow said articles to be dislodged and carried into the inlet ends of the discharge tubes.

38. The dispensing apparatus according to claim 37 wherein said rollers are of soft and inflated construction to deform to the shape of the shell.

39. The dispensing apparatus according to claim 30 and air jet means directing air against the outer side of the shell adjacent the discharge tubes to dislodge the said articles in the apertures for delivery to the inlet ends of the discharge tubes.

40. A dispensing apparatus for seeds comprising an enclosed drum with a periphery carrying seeds upwardly to the open inlet ends of stationary discharge tubes extending outwardly of the drum, means creating a positive air pressure within the drum and producing airflow outwardly through the tubes for conveying the seeds from the drum, the drum having a single shell defining the periphery and having openings in which the seeds are held by the positive air pressure for delivery to the discharge tubes, said shell having recesses surrounding the openings and receiving the seeds which are seated in the openings.

* * * * *

UNITED STATES PATENT OFFICE
CERTIFICATE OF CORRECTION

Patent No. 3,637,108          Dated January 25, 1972

Inventor(s) Leo J. Loesch and Claude E. Loesch

It is certified that error appears in the above-identified patent and that said Letters Patent are hereby corrected as shown below:

In claim 20, line 41, after "openings", insert --for--.

In claim 22, line 57, after "air", insert --flow--.

Signed and sealed this 29th day of August 1972.

(SEAL)
Attest:

EDWARD M. FLETCHER, JR.
Attesting Officer

ROBERT GOTTSCHALK
Commissioner of Patents